(12) United States Patent
Shen et al.

(10) Patent No.: US 11,397,786 B2
(45) Date of Patent: Jul. 26, 2022

(54) METHOD AND SYSTEM OF PERSONALIZED BLENDING FOR CONTENT RECOMMENDATION

(71) Applicant: YAHOO ASSETS LLC, Dulles, VA (US)

(72) Inventors: Rao Shen, Sunnyvale, CA (US); Kostas Tsioutsiouliklis, Saratoga, CA (US); Donghyun Kim, San Jose, CA (US); Yufeng Ma, Sunnyvale, CA (US); Yu Wang, San Jose, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 74 days.

(21) Appl. No.: 16/712,278

(22) Filed: Dec. 12, 2019

(65) Prior Publication Data

US 2021/0182351 A1     Jun. 17, 2021

(51) Int. Cl.
*G06F 16/9535*     (2019.01)
*G06N 20/00*     (2019.01)
*G06N 5/04*     (2006.01)
*G06F 16/958*     (2019.01)

(52) U.S. Cl.
CPC ........ *G06F 16/9535* (2019.01); *G06F 16/972* (2019.01); *G06N 5/04* (2013.01); *G06N 20/00* (2019.01)

(58) Field of Classification Search
CPC ... G06F 16/9535; G06F 16/972; G06N 20/00; G06N 5/04

USPC .......................................................... 707/734
See application file for complete search history.

(56) References Cited

U.S. PATENT DOCUMENTS

| | | | |
|---|---|---|---|
| 10,452,993 B1* | 10/2019 | Hart | G06F 16/13 |
| 2011/0213655 A1* | 9/2011 | Henkin | G06Q 30/0251 |
| | | | 705/14.49 |
| 2013/0268468 A1* | 10/2013 | Vijayaraghavan | |
| | | | G06Q 30/0631 |
| | | | 706/12 |
| 2017/0140053 A1* | 5/2017 | Vorobev | G06F 16/9535 |
| 2019/0311301 A1* | 10/2019 | Pyati | G06F 16/901 |
| 2021/0097374 A1* | 4/2021 | Liu | G06F 16/24578 |

* cited by examiner

*Primary Examiner* — Evan Aspinwall
(74) *Attorney, Agent, or Firm* — Venable LLP

(57) ABSTRACT

The present teaching relates to personalized content recommendation. A webpage is contrasted for a user having a plurality of slots each of which is to be allocated with a content item. For each of the plurality of slots, a plurality of content items in a plurality of types of content are accessed. For each of the plurality of types of content, a personalized score is predicted for each content item in the type of content, wherein the personalized score is obtained based on a trained model trained. A recommended content item of the type of content is selected based on personalized scores. An overall recommended content item is selected and allocated to a slot based on criteria associated with the personalized scores of the recommended content items and a business rule. The webpage with the plurality of slots allocated with content items is provided to the user.

21 Claims, 12 Drawing Sheets

METHOD AND SYSTEM OF PERSONALIZED BLENDING FOR CONTENT RECOMMENDATION

BACKGROUND

1. Technical Field

The present teaching generally relates to methods, systems, and programming for content personalization. Particularly, the present teaching is directed to methods, systems and programming for blending content items from different content corpora.

2. Technical Background

The Internet has made it possible for a person to electronically access virtually any content at any time and from any location. The Internet technology facilitates information publishing, information sharing, and data exchange in various spaces and among different persons. Typically, users issue a search query to a search engine to obtain desirable content. A search engine is one type of information retrieval system that is designed to help users search for and obtain access to information that is stored in a computer system or across a network of computers. In response to a query from a user, the search engine can search different content providers online to obtain search results matching the query. Content providers can be a publisher, a content portal, or any other sources from which content can be obtained.

The ability to deliver personalized content is crucial to content platforms such as Yahoo! News, Google Finance, Facebook, etc., which provide rich content of different types and different topics. For example, the type of content provided could be articles, videos, etc., wherein each type of content is obtained from a specific corpus (i.e., database). Typically, while recommending content of different types, a dedicated model associated with a type of corpus is utilized to recommend content from that corpus. For organizations that want to have their corresponding web sites perform in an optimal manner, understanding personalized content blending and how the web site combines all of the different types of recommendations is critical. Personalized blending for content recommendation faces the problem(s) of merging heterogeneous contents recommended from specialized corpora into a single result set to serve the user's information need and maximize the user's satisfaction. The goodness of a blending operation is measured by a user satisfaction metric, i.e., a better blending will result in a higher level of user satisfaction.

It must be appreciated that the problem of blending content items from different content corpora is different from a traditional content recommendation of homogenous content. In the traditional content recommendation scenario, content items from the same corpus (i.e., content items that are to be recommended to the user) share the same properties as compared with each other. In contrast, in personalized content blending, even though each content corpus has more or less a structured representation, it is very unlikely that the content corpus shares common features with other content corpora due to the heterogeneous nature of different types of content. Accordingly, how to compare the relevance of content items from different corpora and blend them in a correct manner (which increases user's satisfaction level) becomes particularly challenging. As such, one cannot directly apply the same mechanism used in homogeneous contents recommendation to solve the problem of blending different types of content items.

Traditionally, in order to solve the above described problem of personalized content blending, one of two approaches is implemented: a fixed ratio approach or a calibration approach. However, both approaches are neither data driven nor personalized. In the fixed ratio blending approach, a predetermined number of content items of a first type (e.g., video) with respect to content items of another type (e.g., images) is used to provide the user with the different types of content items. Such a fixed ratio approach is not a desirable solution as it does not address personalization. Specifically, some users may want to see more videos, while other users may want to see a smaller number of videos. With regard to the calibration approach, availability of a ground truth is typically assumed. Specifically, it is assumed that there is a ground truth available such that recommendation scores from different corpus can be calibrated against the ground truth. For example, score with 0.8 value from a video recommendation model is comparable with a score of 0.75 from an article recommendation model. However, in practice, it is difficult to find a ground truth against which content items from different corpora can be calibrated against. Moreover, such a calibration approach also incurs the drawback of scalability. Accordingly, there is a need to devise a solution to address the above stated problems.

SUMMARY

The teachings disclosed herein relate to methods, systems, and programming for content personalization. Particularly, the present teaching is directed to methods, systems and programming for blending content items from different content corpora.

One aspect of the present disclosure provides for a method, implemented on a machine having at least one processor, storage, and a communication platform capable of connecting to a network for personalized content recommendation. The method comprises the steps of: constructing a webpage for a user having a plurality of slots each of which is to be allocated with a content item; for each of the plurality of slots, accessing a plurality of content items in a plurality of types of content, for each of the plurality of types of content, predicting a personalized score for each content item in the type of content, wherein the personalized score represents an estimated level of satisfaction when the content item is recommended to the user and is obtained based on a model trained using training data associated with the user, and selecting a recommended content item of the type of content based on personalized scores of the content items of the type, selecting an overall recommended content item from the recommended content items of the plurality of types of content based on criteria associated with the personalized scores of the recommended content items and a business rule, and allocating the overall recommended content item to the slot; and providing the webpage with the plurality of slots allocated with content items to the user.

By one aspect of the present disclosure, there is provided a system for content personalization. The system comprises at least one processor configured to: construct a webpage for a user having a plurality of slots each of which is to be allocated with a content item; for each of the plurality of slots, access a plurality of content items in a plurality of types of content, for each of the plurality of types of content, predict a personalized score for each content item in the type of content, wherein the personalized score represents an estimated level of satisfaction when the content item is recommended to the user and is obtained based on a model trained using training data associated with the user, and select a recommended content item of the type of content based on personalized scores of the content items of the type, select an overall recommended content item from the recommended content items of the plurality of types of content based on criteria associated with the personalized scores of the recommended content items and a business rule, and allocate the overall recommended content item to the slot; and provide the webpage with the plurality of slots allocated with content items to the user.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a non-transitory computer readable medium including computer executable instructions, wherein the instructions, when executed by a computer, cause the computer to perform a method for personalized content recommendation. The method comprises the steps of: constructing a webpage for a user having a plurality of slots each of which is to be allocated with a content item; for each of the plurality of slots, accessing a plurality of content items in a plurality of types of content, for each of the plurality of types of content, predicting a personalized score for each content item in the type of content, wherein the personalized score represents an estimated level of satisfaction when the content item is recommended to the user and is obtained based on a model trained using training data associated with the user, and selecting a recommended content item of the type of content based on personalized scores of the content items of the type, selecting an overall recommended content item from the recommended content items of the plurality of types of content based on criteria associated with the personalized scores of the recommended content items and a business rule, and allocating the overall recommended content item to the slot; and providing the webpage with the plurality of slots allocated with content items to the user.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
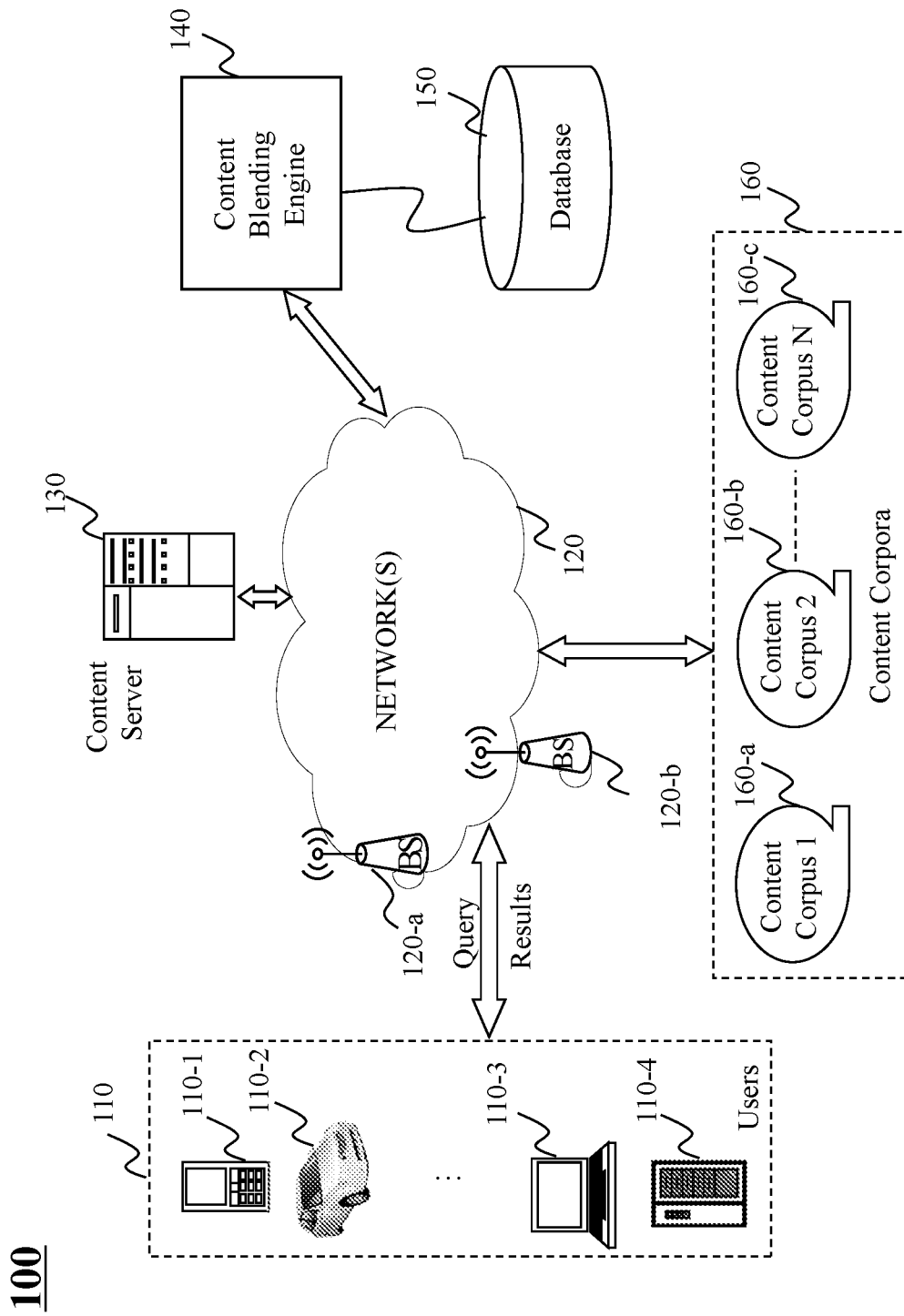
FIG. 1 illustrates an exemplary system configuration in which a content blending engine can be deployed, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The problem of personalized content blending can be broadly defined as determining an optimal manner of aggregating content items of different types to be provided to a user. Described herein is a method, system, and a computer program product to solve the problem of personalized blending for content recommendation. As heterogeneous results are combined with one another, it is important to present them in a proper manner so as to maximize user satisfaction. Despite a few recent advances, there are still a few challenges to address this problem: (a) Heterogeneous nature of different corpora—a manner in which each different corpora recommends its content items may be unknown to each other. Furthermore, the recommendation score returned from the different corpus are not comparable to one another. Moreover, the scale of corpora and the increasing number of content properties requires a solution which is efficient and scalable; (b) User satisfaction definition—it is rather unclear how to determine a scoring function that maps the blended content presentation to user satisfaction for each particular user. Determining the right user satisfaction metric based on user responses is not a trivial task. Typically, the user satisfaction metric is heuristically defined as an aggregation of fine-grained user responses, such as click-through rates and long-dwell-time clicks; and (c) Training data collection—model-based approaches have become popular in recent years, and machine learning techniques have been used to fit the models. A new challenge that is posed with such approaches is how to gather enough data with labels to train the model. Hiring editors to judge the results can be expensive and is not scalable. Getting judgements is difficult and can be biased if personalization needs to be considered. Different from the traditional recommendation problems, wherein content items of the same type of corpus are to be presented to users, in the blending content items problem, if the content items of different types has not been blended to be shown to users, the recommendation system will receive no feedback, and thus will have no knowledge as to whether this type of content matches the user's interest or if it is preferred over other types of content.

Accordingly, by one embodiment of the present disclosure, a guided exploration technique is provided in order to reduce the impact of exploration on user experience and make efficient use of the limited amount of traffic to collect user feedback on data. Further, to address the challenges of aggregating contents recommended from heterogeneous corpus, the present disclosure provides for a personalized content blending approach in a unified and principled manner. Specifically, by one embodiment, the problem of personalized content blending is formulated as a multi-armed contextual bandit (MA-CB) problem. The MA-CB problem models a situation where, in a sequence of independent trials, a model chooses, based on a given contextual information, an action from a set of possible actions so as to maximize total rewards of the chosen actions. The reward depends on both the action chosen and the context.

As will be described later, each type of corpus is modeled as a bandit and reward is used as a proxy for user satisfaction. It must be appreciated that a higher amount of rewards corresponds to a higher level of user satisfaction. Rewards depend on how engaged users are with the recommendation system. Examples of user engagement may be click-skip based or dwell time based user interactions. Moreover, an action (with regard to the MA-CB problem) corresponds to selecting a type of content item from the different types of content corpus and allocating the selected content item at a position (i.e., a slot) on a webpage.

According to one embodiment, the recommendation system learns a reward predictor from the training data collected from guided exploration strategy. It must be appreciated that the reward predictor is a scoring function that maps content items to a user satisfaction metric. Thereafter, given a user, the reward predictor can estimate the expected reward for each content item (of different types or different topics), and organize the blending result in a way which maximizes the total reward. Specifically, as will be described later, by one embodiment, a greedy slotting technique is employed to allocate content items in each slot of a webpage. Thus, in contrast to the scenario of relying on human judgements, embodiments as described in the present disclosure leverage implicit user feedback in order to learn the model. Such a method is efficient to implement and can be applied to corpora of different nature.

Turning now to FIG. 1, there is illustrated an exemplary system configuration in which a content blending engine 140 can be deployed in accordance with various embodiments of the present teaching. In the configuration 100 depicted in FIG. 1, the content blending engine 140 is directly connected to a network 120 and operates as an independent service on the network. In FIG. 1, the exemplary system 100 includes users 110, a network 120, a content server 130, the content blending engine 140, a database 150, and content corpora 160, including content corpus 1 160-*a*, content corpus 2 160-*b*, . . . , and content corpus N 160-*c*.

The network 120 may be a single network or a combination of different networks. For example, the network may be a local area network (LAN), a wide area network (WAN), a public network, a private network, a proprietary network, a Public Telephone Switched Network (PSTN), the Internet, a wireless network, a cellular network, a virtual network, or any combination thereof. A network may also include various network access points, e.g., wired or wireless access points such as base stations or Internet exchange points 120-*a*, . . . , 120-*b*, through which a data source may connect to the network 120 in order to transmit information via the network and a network node may connect to the network 120 in order to receive information. In one embodiment, the network 120 may be a content distribution network that connects users 110 to the content server 130 and the content blending engine 140, which provide the users with a mix (i.e., blend) of relevant content items obtained from the content corpora 160.

Users 110 may be of different types such as users connected to the network via desktop connections (110-4), users connecting to the network via wireless connections such as through a laptop (110-3), a handheld device (110-1), or a built-in device in a motor vehicle (110-2). A user may send a query to the content server 130 or the content blending engine 140 via the network 120 and receive (as response) a corresponding search result (e.g., webpage including blended content items) through the network 120. By one embodiment, a user's query may be directed to the content server 130. Alternatively, in some embodiments, the query may be directed directly to the content blending engine 140. Accordingly, the user's query may be handled by either the content server 130 or the content blending engine 140, both of which may search for content items from the content corpora 160 that are to be blended i.e., inserted on the webpage to be rendered to the user.

Content corpora 160, may correspond to an entity, whether an individual, a firm, or an organization, publishing or supplying content, including a blogger, television station, a newspaper issuer, a web page host, a content portal, an online service provider, or a game server. For example, in connection to an online or mobile ad network, content source 160 may be an organization such as CNN.com, a content portal such as YouTube and Yahoo.com, or a content-soliciting/feeding source such as Twitter or blogs. By one embodiment of the present disclosure, each content corpus stores a specific type of content items. For example, content corpus 1 160*a* may store content items of type images, content corpus 2 160*b* may store content items of type videos, content corpus N 160*c* may store content items of type articles/document etc.

Figure 2:
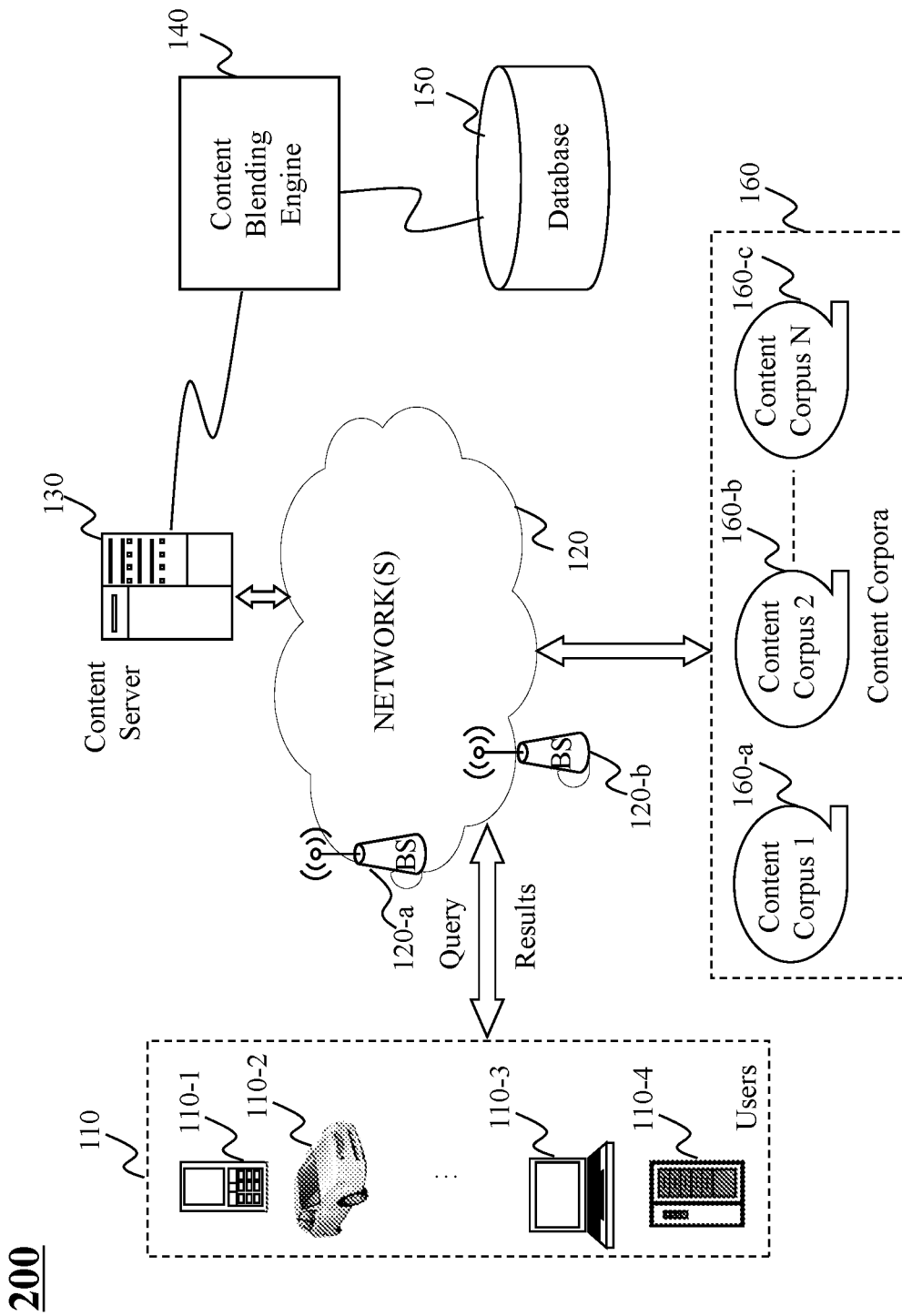
FIG. 2 illustrates another exemplary system configuration in which a content blending engine can be deployed, according to an embodiment of the present teaching.

As stated previously, the embodiment illustrated in FIG. 1 includes the content blending engine 140 operating as an independent service (i.e., a standalone service) on the network 120. In FIG. 2, an alternate configuration 200 is provided, wherein the content blending engine 140 operates as a special module in the backend of the content server 130. When there are multiple content servers (not shown), each may have its own backend module for content processing/blending purposes. Nonetheless, it must be appreciated that the content blending engine 140 as shown in FIG. 2 performs functions similar to those described above with reference to FIG. 1. In what follows, there is provided a detailed description of the processing performed by the content blending engine 140.

Figure 3:
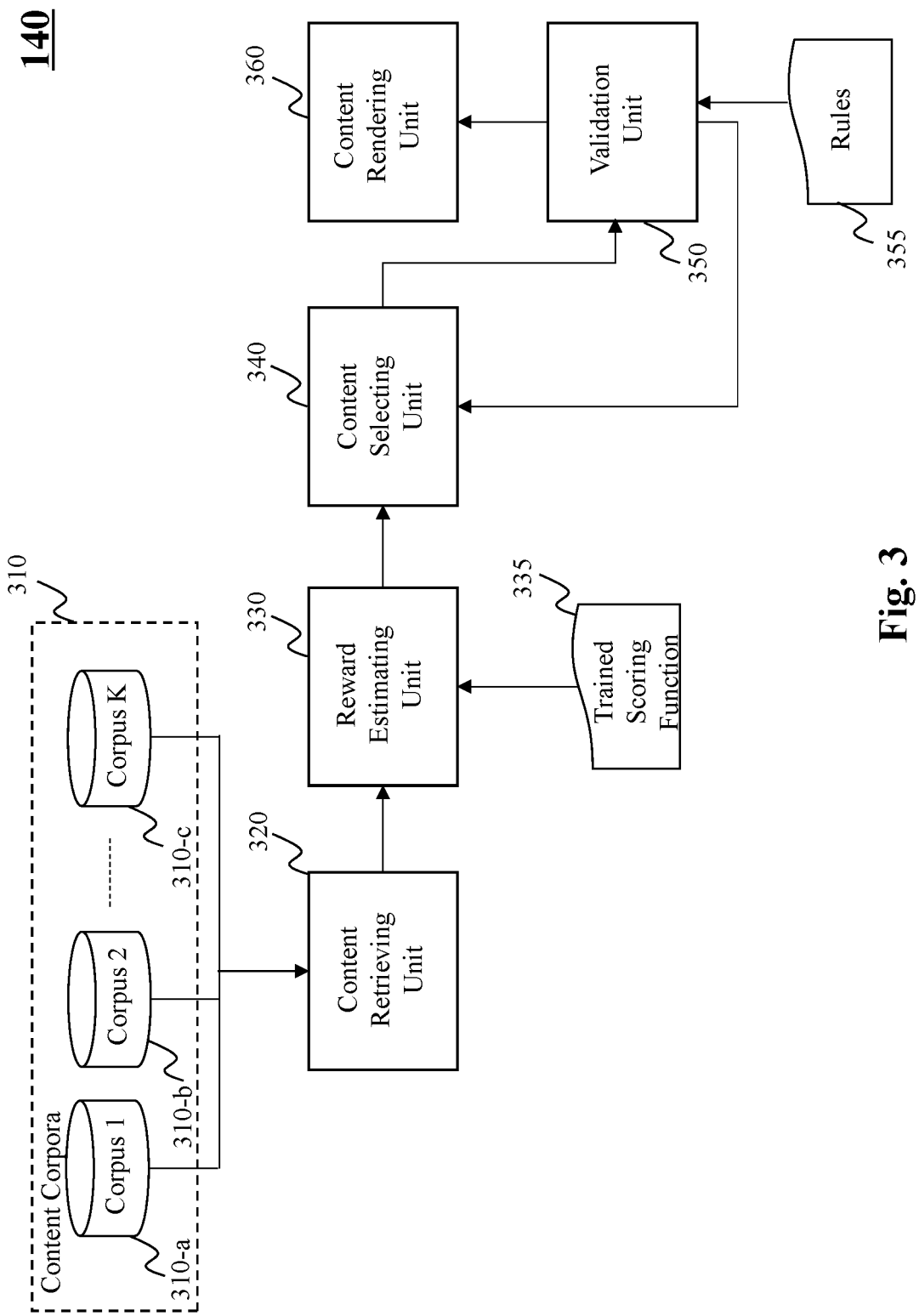
FIG. 3 depicts an exemplary system diagram of a content blending engine, according to various embodiments of the present teaching.
Figure 9A:
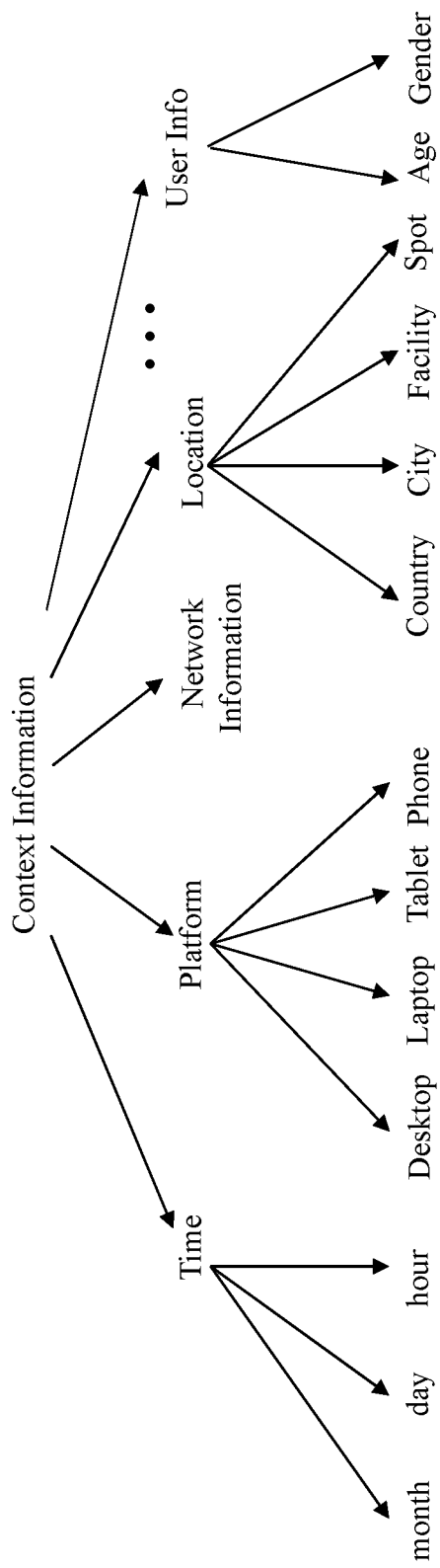
FIG. 9A depicts exemplary contextual information according to various embodiments of the present teaching.
Figure 9B:
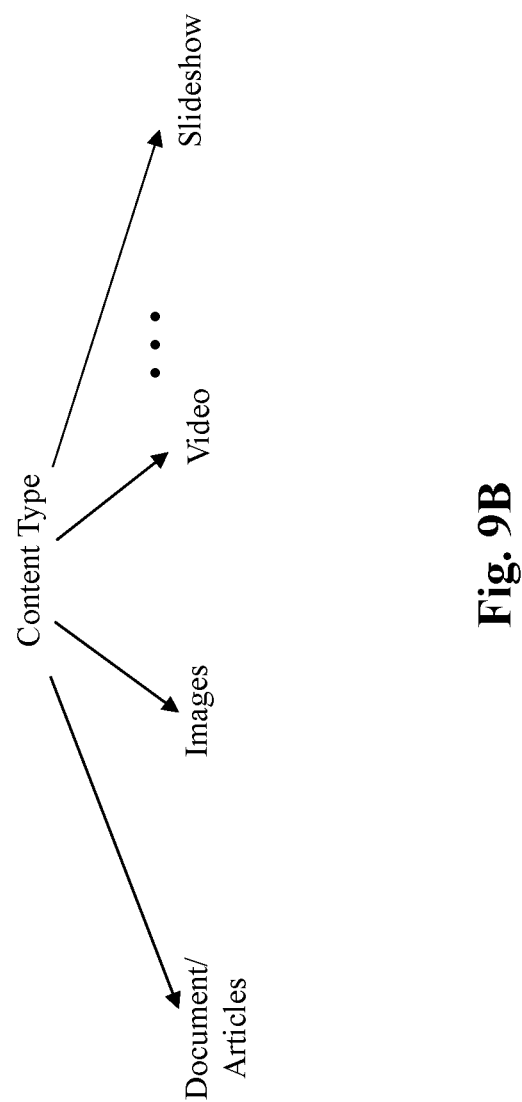
FIG. 9B depicts exemplary content types according to various embodiments of the present teaching.

FIG. 3 depicts an exemplary system diagram of a content blending engine 140, according to various embodiments of the present teaching. The content blending engine 140 comprises a content corpora 310 including content corpus 1 310-*a*, content corpus 2 310-*b*, and content corpus K 310-*c*. The different types of content items included in the content corpora 310 may include content types such as document/articles, images, videos, slideshows, etc., as shown in FIG. 9B. The content blending engine 140 further includes a content retrieving unit 320, a reward estimating unit 330, a content selecting unit 340, a validation unit 350, a content rendering unit 360, and a trained scoring function 335.

By one embodiment, the content blending engine 140 performs blending of different types of content items to be provided to a user through a data-driven machine learning process. The content blending engine 140 collects training data records from a guided exploration strategy and learns a reward predictor, i.e., a model, which is a scoring function that maps blended content items to a user satisfaction metric. Given a user, the reward predictor can estimate the expected reward for each content item (of different types or different topics) and optimize the total rewards of a blending in order to maximize user satisfaction.

As described below, upon obtaining a trained/learned scoring function (i.e., the reward predictor), the content blending engine 140 utilizes a greedy slotting mechanism to determine the final slotting of content items on a webpage. For each slot on a webpage that is to be allocated with a content item, the content retrieving unit 320 accesses a plurality of content items in a plurality of types of content from the content corpora 310. For each of the plurality of types of content (i.e., content from corpus 310-*a*, 310-*b*, 310-*c*, etc.), the reward estimating unit 330 predicts a reward (i.e., a personalized score) for each content item in the type of content. Note that the reward or the personalized score represents an estimated level of satisfaction when the content item is recommended to the user. The reward is predicted based on the trained scoring function 335, i.e., a model trained using training data associated with the user. Details pertaining to the training of the reward predictor are described next with reference to FIG. 5.

By one embodiment, the content selecting unit 340 is configured to select a recommended content item of the type of content based on personalized scores of the content items of the type. Specifically, the selecting unit 340 is configured to select a content item from each of the corpus's 310-*a*, 310-*b*, and 310-*c*. The selected content item from each data corpus (i.e., the recommended content item from each data corpus) corresponds to the content item having the highest reward (predicted score) among the content items of the data corpus.

Further, the selecting unit 340 is configured to select an overall recommended content item from the recommended content items to be allocated to the slot under consideration. By one embodiment, the selecting unit 340 selects the overall recommended content item (from the recommended content items) as the one having the highest predicted score. The selected overall recommended content item is validated by the validation unit 350 in accordance with rules 355. In response to a successful validation, the selected overall recommended content item is allocated to the slot. However, in response to an unsuccessful validation, the selected overall recommended content item is discarded and the validation unit 350 instructs the selecting unit to select an alternate overall recommended content item.

The rules 355 used by the validation unit 350 to validate a content item may correspond to business rules such as prohibiting a successive display (i.e., in successive slots) of similar types of content items, prohibiting display of a certain type of content item at specific slots on the webpage, etc. It must be appreciated that the rules 355 may correspond to business rules and/or correspond to rules specified by the user, for example, based on the user's preference. The validated content item is allocated to the slot under consideration. The process as described above is then performed for the next slot on the webpage and is repeated until a stopping condition is satisfied e.g., all slots on the webpage are allocated a content item respectively. In response to the stopping condition being satisfied, the content rendering unit 360 constructs a webpage with all the slots allocated with content items and provides the webpage to the user. In this manner, the content blending engine 140 maps heterogeneous items based on a commonly trained (with respect to the different types of content items) reward predictor and allows one to compare the relevance and blend of the content items in a principled manner.

Figure 4:
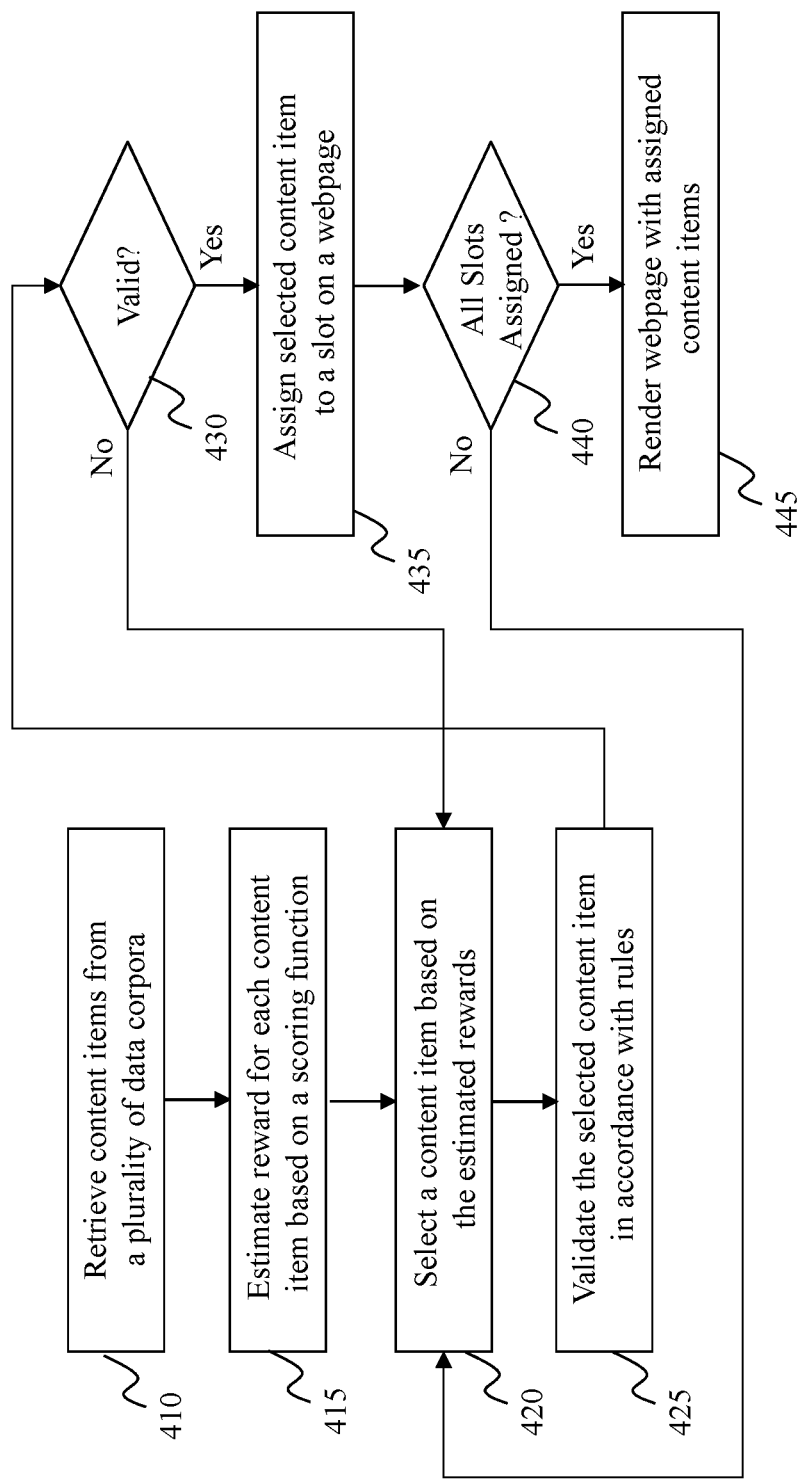
FIG. 4 is a flowchart of an exemplary process performed by a content blending engine, according to various embodiments of the present teaching.

FIG. 4 is a flowchart of an exemplary process performed by a content blending engine 140 according to various embodiments of the present teaching. The process commences in step 410 wherein different types of content items are retrieved from respective content corpus i.e., a plurality of content items in a plurality of types of content are accessed.

In step 415, for each of the plurality of types of content, a reward is predicted for each content item in the type of content. The reward is predicted based on a trained scoring function. In step 420, a content item is selected based on the predicted rewards. Specifically, as described above an overall recommended content item from recommended content items of the plurality of types of content is selected. The process then moves to step 425, wherein the overall recommended content item is validated in accordance with some rules.

In step 430, a query is performed to determine whether the selected overall recommended content item is valid. If the response to the query is affirmative, the process moves to step 435, else is the response to the query is negative, the process loops back to step 420. In step 435, the validated overall recommended content item is assigned to a slot (on a webpage) under consideration. Thereafter, in step 440, a further query is performed to determine whether all slots have been allocated with a content item respectively. If the response to the query is affirmative, the process moves to step 445, wherein a webpage including the content items allocated to the respective slots is rendered and provided to the user. However, if the response to the query in step 440 is negative, the process simply loops back to step 420 to determine an overall recommended content item to be allocated to the next slot on the webpage.

Figure 5:
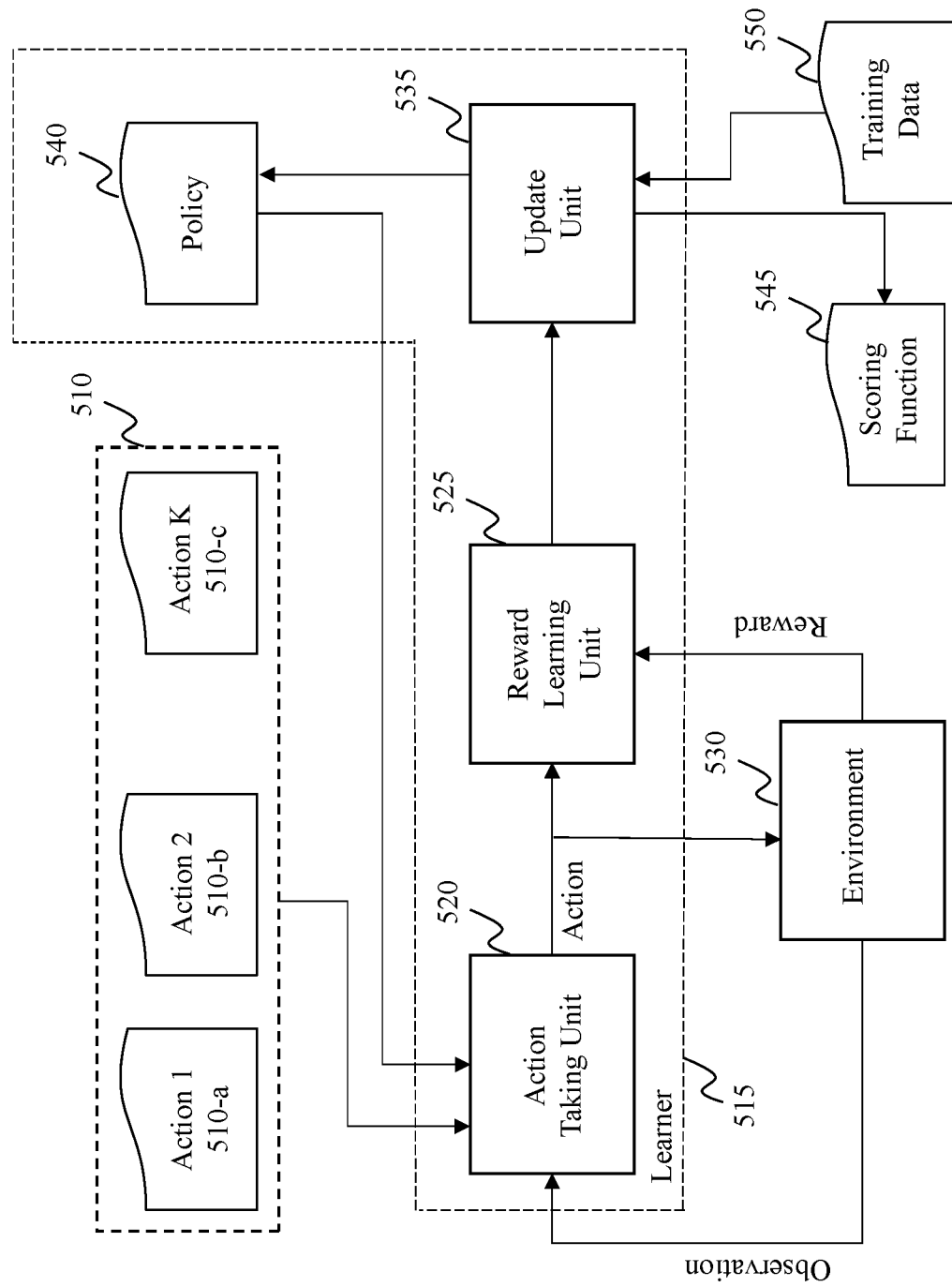
FIG. 5 depicts an exemplary system diagram of a training engine for training a reward predictor, according to various embodiments of the present teaching.

Turning now to FIG. 5, there is depicted an exemplary system diagram of a training engine for training a reward predictor, according to various embodiments of the present teaching. As stated previously, according to one embodiment of the present disclosure, the problem of personalized content blending is formulated as the multi-armed contextual bandit (MA-CB) problem. In the MA-CB problem formulation, each data corpus is modeled as a bandit, and an action corresponds to selecting a content item from one of the data corpus. In what follows, there is described a mechanism of training a reward predictor under the MA-CB setting.

As shown in FIG. 5, the training engine includes a learner 515, an environment 530, and a plurality of actions 510 including action 1 510-a, action 2 510-b, action K 510-c. Note that each action corresponds to a data corpus. The learner unit 515 includes an action taking unit 520, a reward learning unit 525, an update unit 535, and a policy 540. Over a predetermined number of training iterations, the interactions between the learner unit 515 and the environment 530 results in a trained reward predictor i.e., scoring function 545.

By one embodiment of the present disclosure, the MA-CB problem can be formalized by defining a set of actions A (i.e., Action 1, Action 2, . . . Action K), a contextual vector for each iteration of the training, a reward for each iteration, and a policy. It must be appreciated that the contextual vector corresponds to environmental information. Exemplary information included in the contextual vector can comprise of time, platform, location, user information, etc., as shown in FIG. 9A. The reward is a proxy for a level of user satisfaction, and the policy is mapping from contextual information to an action.

The interactions between the learner and the environment can be described as follows. In each iteration of the training, a contextual information is revealed to the learner 515 i.e., an observation is provided by the environment 530 to the learner 515. Upon receiving an observation, the action taking unit 520 of the learner 515, utilizes a policy 540 to select an action from the set of actions 510. It must be noted that when the learner is provided an observation, the learner 515 has no knowledge of the rewards associated with the actions. Only upon selecting a particular action, the reward learning unit 525 (of the learner 515) receives reward information (pertaining to only the selected action) from the environment 530. Because of the fact that the learner 515 does not receive any feedback for the unchosen actions, in order to get a good knowledge of them, the learner 515 has to gather information about the unchosen actions by choosing the unchosen actions once in a while. This kind of strategy is referred as exploration, which is in contrast to the strategy of exploitation, which pertains to selecting an action from an already chosen action type. Exploration could harm the received reward in short term as some suboptimal action may be chosen. On the other hand, obtaining information about the action through exploration can help the learner get a better estimation of the actions' rewards, and in turn increase the long term overall reward.

The action taking unit 520 of the learner 515 selects an action from the set of actions 510 based on the policy 540. The policy 540 is the behavior of the learner and affects the balance between exploitation and exploration. For instance, the learner 515 may start with random exploration. After several iterations of random exploration, the learner will good estimate of rewards for each action. The learner 515 may then either exploit (i.e., greedily select the action with the best estimate reward) or randomly try another action. The update unit 535 updates the policy based on the data (i.e., action and associated reward) learned at each iteration. By one embodiment of the present disclosure, in order to efficiently balance between the exploration and exploitation strategies, a guided exploration strategy is provided. Specifically, training data 550 generated based on user's previous interactions is provided to the update unit 535 to help the learner 515 update the policy 540. As will described next with reference to FIG. 7, weighted training data (associated with the user) is generated to provide a guided exploration mechanism to the learner 515 in order to understand the user's preference. In this manner, the scoring function 545 i.e., the reward predictor is trained using data collected at each iteration of training i.e., via exploration and/or exploitation strategies.

Figure 6:
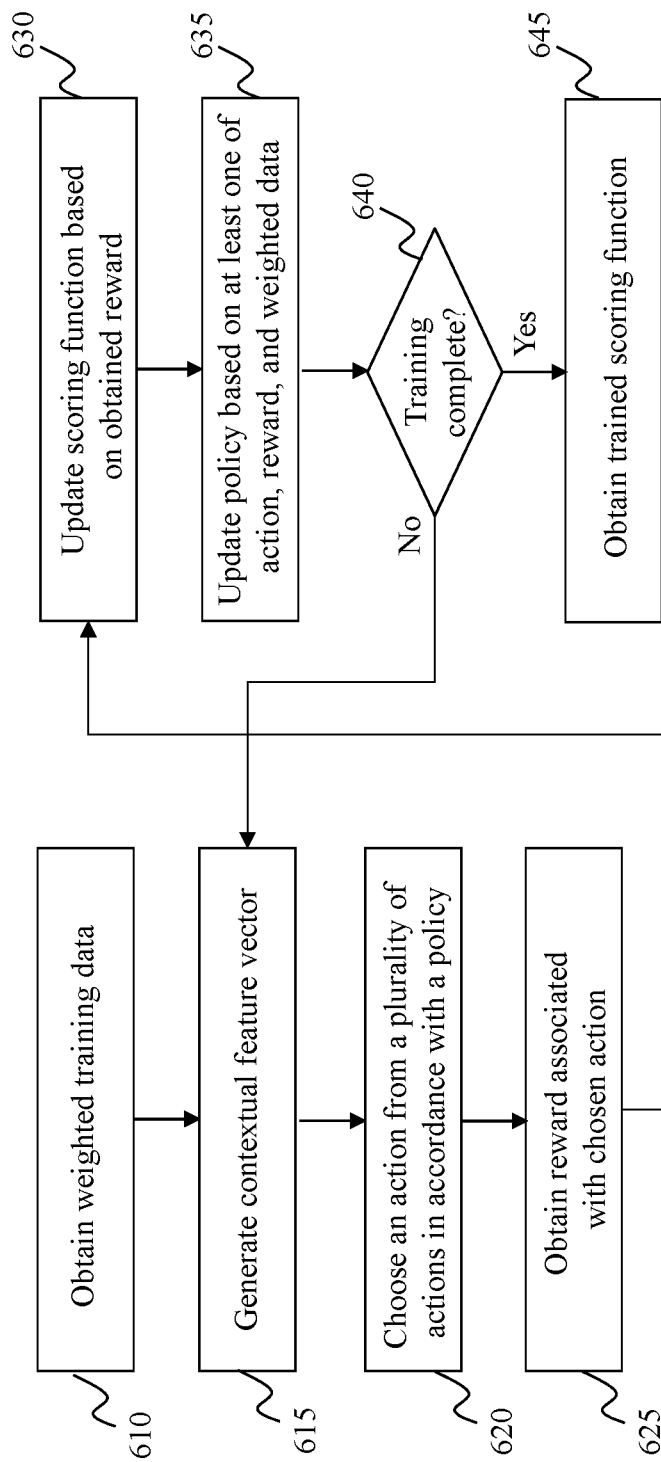
FIG. 6 is a flowchart of an exemplary process performed by a training engine to train a reward predictor, according to various embodiments of the present teaching.

FIG. 6 is a flowchart of an exemplary process performed by a training engine to train a reward predictor, according to various embodiments of the present teaching. The process commences in step 610 wherein weighted training data is obtained. Details regarding the generation of the weighted are described later with reference to FIG. 7. In step 615, a contextual feature vector is generated. The generated contextual feature is provided to the learner unit of the training engine. The process then moves to step 620, wherein an action from a plurality of actions is chosen in accordance with a policy. In step 625, upon choosing an action, a reward associated with the action is learnt.

In step 630, the scoring function i.e., the reward predictor model is updated based on the chosen action and the learnt reward. Further, in step 635, the policy is updated based on at least one of the chosen action and the learnt reward, and the weighted training data. In step 640, a query is performed to determine whether training is complete e.g., check whether a predetermined number of training iterations have been completed. If the response to the query is affirmative, the process moves to step 645, wherein a trained scoring function is obtained. However, if the response to the query of step 640 is negative, the process loops back to step 615 to execute another training iteration.

Figure 7:
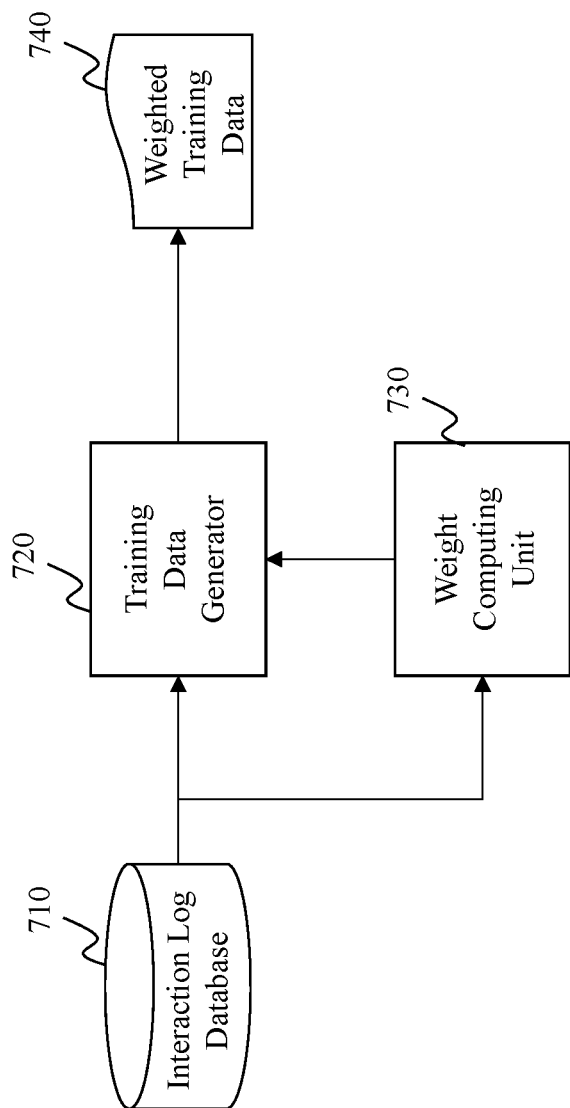
FIG. 7 depicts an exemplary system diagram of a training data generator, according to various embodiments of the present teaching.

FIG. 7 depicts an exemplary system diagram of a training data generator, according to various embodiments of the present teaching. The training data generator includes an interaction log database 710, a training data generator 720, and a weight computing unit 730. The interaction log database includes training data records associated with a user. The training data records be used for unbiased estimation of expected rewards. Each training data record in the interaction log database 710 is represented as a four-tuple and corresponds to a slotting decision previously taken.

By one embodiment, the four-tuple is represented as (a, p, x, r), wherein the parameter a corresponds to an action taken i.e., which content item (video, article, slideshow, etc.,) was shown at a particular slot position to the user. The parameter p corresponds to a probability that the content item was slotted, the parameter x corresponds to a feature vector of the content item associated with a context (e.g., time, location, preference, etc.), and the parameter r corresponds to the score associated with the content item.

By one embodiment, the weight computing unit 730 extracts the parameter p for each training data record and computes a weight that is to be associated with the training data record. The weight computed by the weight computing unit 730 is inversely proportional to the parameter p i.e., probability. For instance, by one embodiment, the weight computing unit 730 computes the weight for each training data record as: $w=1/p$. The training data generator 720 associates the weight computed by the weight computing unit 730 to each training data record to generate weighted training data 740.

It must be appreciated that the weight computed by the weight computing unit 730 is inversely proportional to the probability associated with the content item, as the idea is that if a content item has a lower probability to be shown at a certain position, then the content item has to be treated more importantly than content item frequently shown. Accordingly, in training of the reward predictor, one can take the weight of each training data record into consideration to determine whether an exploration or exploitation action is to be taken. In this manner, the training engine as described previously with reference to FIG. 5 provides a guided exploration mechanism to understand the user's preference. Moreover, the training engine is less likely to be affected by the noise from existing system and setup. In practice, assigning higher weights to rare data records also alleviates the data imbalance problem.

Figure 8:
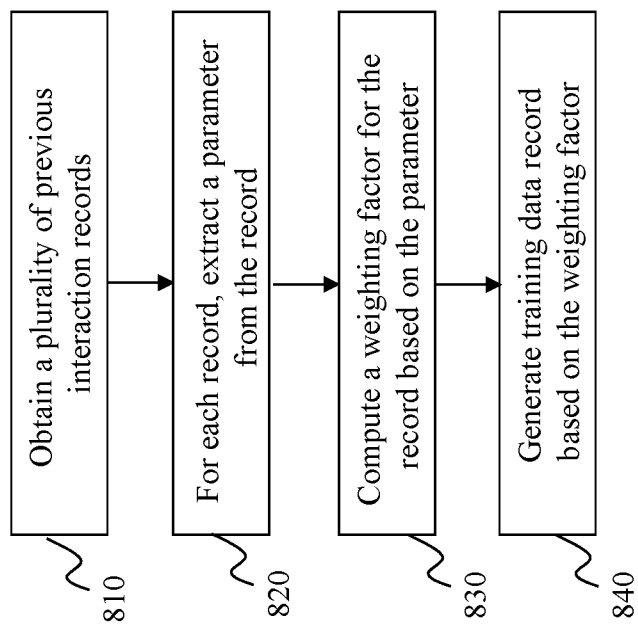
FIG. 8 is a flowchart of an exemplary process performed by a training data generator, according to various embodiments of the present teaching.

FIG. 8 is a flowchart of an exemplary process performed by a training data generator, according to various embodiments of the present teaching. The process commences in step 810, wherein a plurality of interaction records (i.e., training data records) of a user are obtained. In step 820, a parameter is extracted from each training data record. Note that each training data record is represented as a four-tuple as described previously.

The process then moves to step 830, wherein a weighting factor is computed for each training data record. By one embodiment, the weighing factor is computed based on the parameter extracted in step 820. Further, in step 840, the computed weighing factor is associated with the training data record to generate weighted training data associated with the user.

Figure 10:
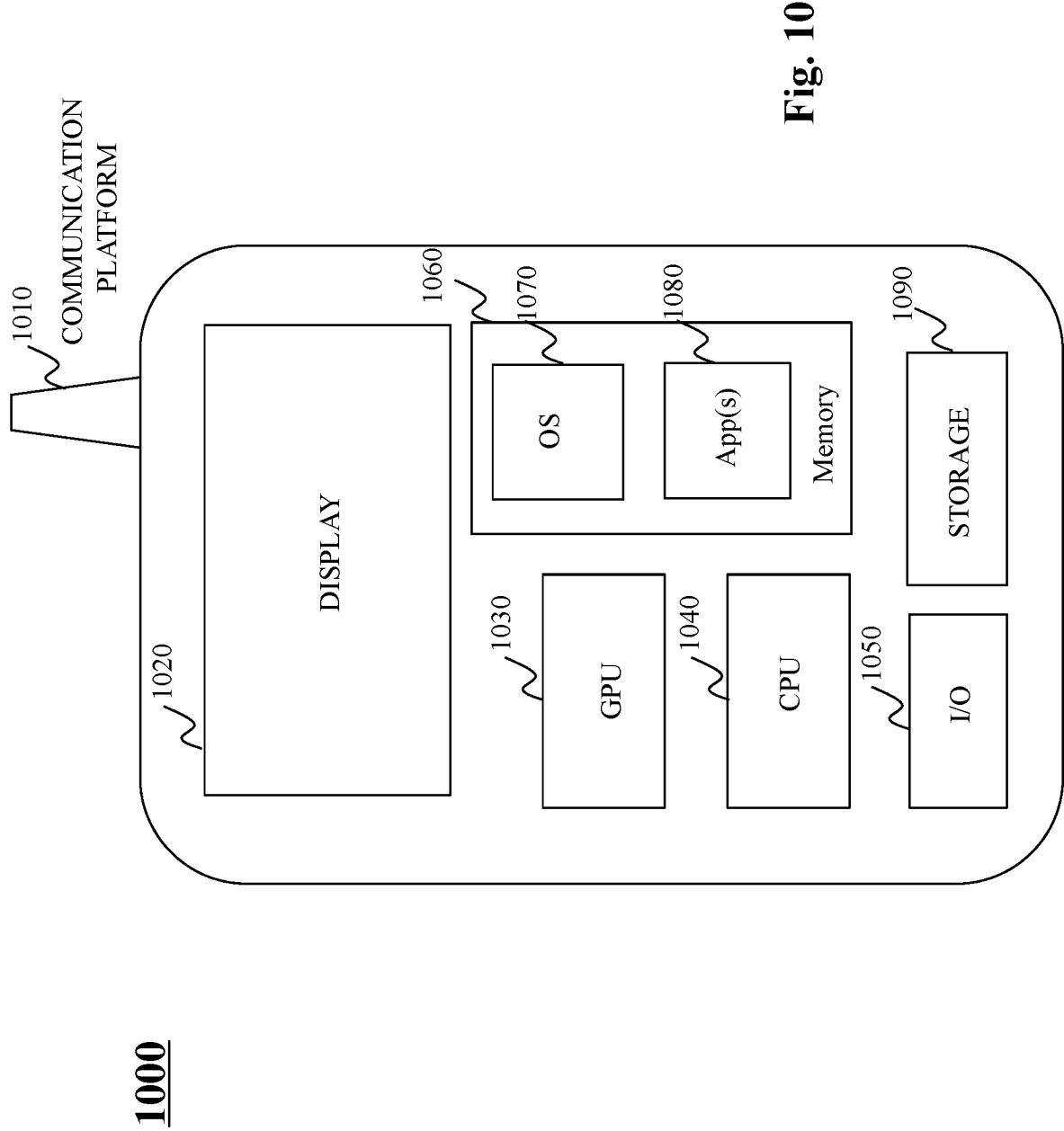
FIG. 10 depicts an architecture of a mobile device which can be used to implement a specialized system incorporating the present teaching.

Turning now to FIG. 10, there is depicted an architecture of a mobile device 1000, which can be used to realize a specialized system implementing the present teaching. In this example, a user device on which the functionalities of the various embodiments described herein can be implemented is a mobile device 1000, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1000 in this example includes one or more central processing units (CPUs) 1040, one or more graphic processing units (GPUs) 1030, a display 1020, a memory 1060, a communication platform 1010, such as a wireless communication module, storage 1090, and one or more input/output (I/O) devices 1050. Any other suitable component, including but not limited to a system bus or a controller (not shown), may also be included in the mobile device 1000. As shown in FIG. 10, a mobile operating system 1070, e.g., iOS, Android, Windows Phone, etc., and one or more applications 1080 may be loaded into the memory 1060 from the storage 1090 in order to be executed by the CPU 1040. The applications 1080 may include a browser or any other suitable mobile apps for performing the various functionalities on the mobile device 1000. User interactions with the content displayed on the display panel 1020 may be achieved via the I/O devices 1050.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 11:
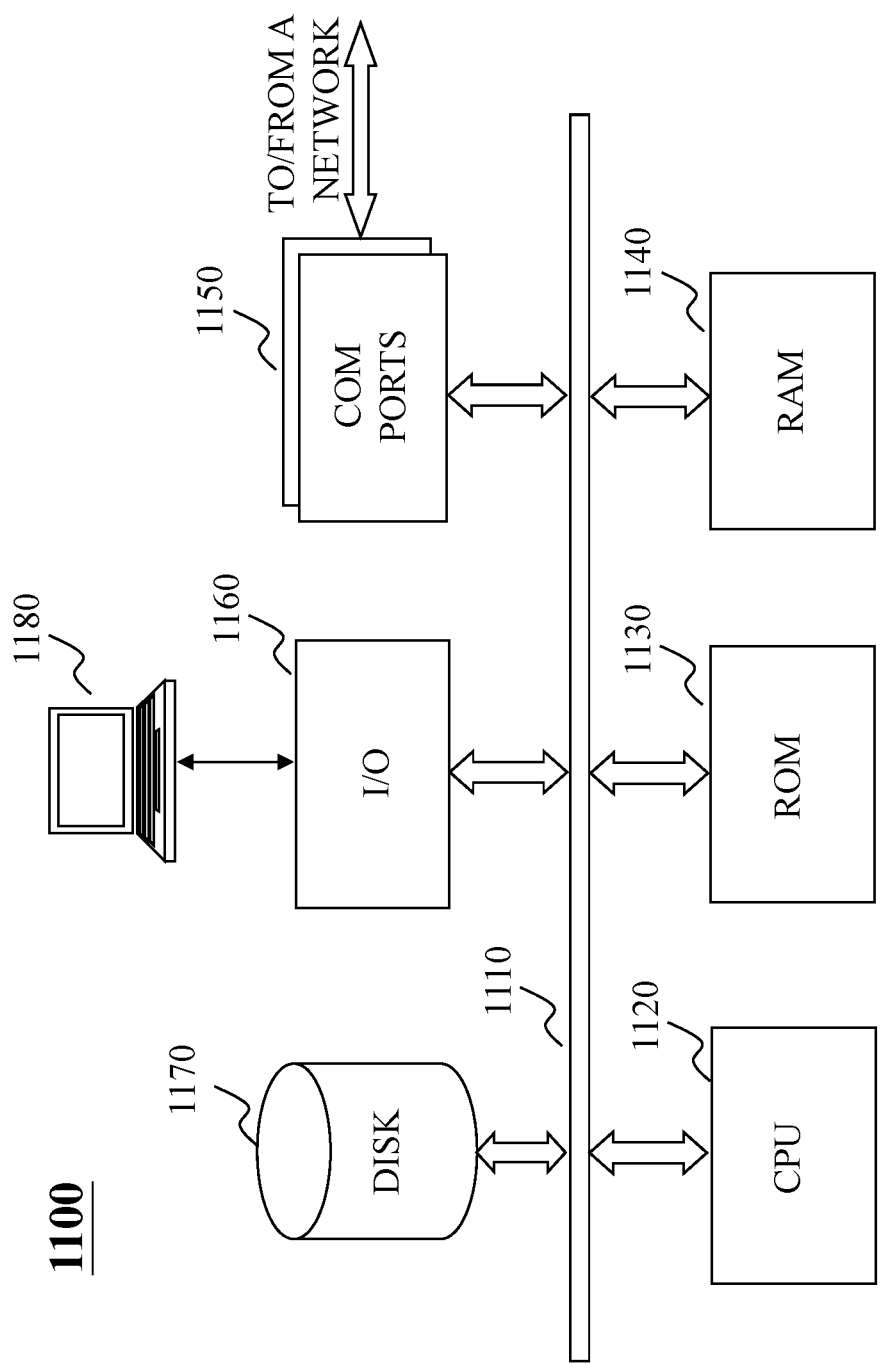
FIG. 11 depicts the architecture of a computer which can be used to implement a specialized system incorporating the present teaching.

FIG. 11 is an illustrative diagram of an exemplary computer system architecture, in accordance with various embodiments of the present teaching. Such a specialized system incorporating the present teaching has a functional block diagram illustration of a hardware platform which includes user interface elements. Computer 1100 may be a general-purpose computer or a special purpose computer. Both can be used to implement a specialized system for the present teaching. Computer 1100 may be used to implement any component(s) described herein. For example, the present teaching may be implemented on a computer such as computer 1100 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1100, for example, may include communication ports 1150 connected to and from a network connected thereto to facilitate data communications. Computer 1100 also includes a central processing unit (CPU) 1120, in the form of one or more processors, for executing program instructions. The exemplary computer platform may also include an internal communication bus 1110, program storage and data storage of different forms (e.g., disk 1170, read only memory (ROM) 1130, or random access memory (RAM) 1140), for various data files to be processed and/or communicated by computer 1100, as well as possibly program instructions to be executed by CPU 1120. Computer 1100 may also include an I/O component 1160 supporting input/output flows between the computer and other components therein such as user interface elements 1180. Computer 1100 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the content blending engine into the hardware platform(s) of a computing environment or other system implementing a computing environment or similar functionalities in connection with blending of content. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the content blending engine, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for personalized content recommendation, the method comprising:
    constructing, by a content blending engine, a webpage for a user having a plurality of slots each of which is to be allocated with a content item;
    generating, by the content blending engine, via machine learning based on training data associated with the user, a model for estimating user satisfaction;
    for each of the plurality of slots, by the content blending engine,
        accessing a plurality of content items in a plurality of types of content,
        for each of the plurality of types of content,
            predicting, based on the model, a personalized score for each content item in the type of content, wherein the personalized score represents an estimated level of user satisfaction with the content item when the content item is recommended to the user, and
            selecting a recommended content item of the type of content based on personalized scores of the content items of the type,
        selecting an overall recommended content item from the recommended content items of the plurality of types of content based on criteria associated with the personalized scores of the recommended content items,
        performing validation of the selected overall recommended content item based on a rule indicating whether a type of content of the selected overall recommended content item is allowed to be displayed at the slot, and
        allocating, based on a successful validation, the overall recommended content item to the slot; and
    providing, by the content blending engine, the webpage with the plurality of slots allocated with content items to the user.

2. The method of claim 1, wherein the recommended content item of the type of content has a highest personalized score among the content items of the type.

3. The method of claim 1, wherein the criteria associated with the personalized scores of the recommended content items includes a first criterion corresponding to the overall recommended content item having a highest personalized score among the recommended content items in the plurality of types of content.

4. The method of claim 1, wherein the criteria associated with the personalized scores of the recommended content items includes a second criterion corresponding to a number of a type of the overall recommended content item being less than threshold.

5. The method of claim 1, wherein training data associated with the user includes a plurality of training data-records, each of which is represented by a four-tuple including:
 a first parameter corresponding to a type of a content item associated with the data-record,
 a second parameter corresponding to a probability that the content item is slotted,
 a third parameter corresponding to a feature vector of the content item and an associated contextual vector, and
 a fourth parameter corresponding to a personalized score of the content item.

6. The method of claim 5, wherein the training data-record is associated with a weight computed based on the second parameter.

7. The method of claim 6, wherein the weight is inversely proportional to the second parameter.

8. The method of claim 1, wherein the plurality of types of content include at least documents, images, videos, and slideshows.

9. A non-transitory computer readable medium including computer executable instructions, wherein the instructions, when executed by a content blending engine, cause the content blending engine to perform a method for personalized content recommendation, the method comprising:
 constructing a webpage for a user having a plurality of slots each of which is to be allocated with a content item;
 generating, via machine learning based on training data associated with the user, a model for estimating user satisfaction;
 for each of the plurality of slots,
  accessing a plurality of content items in a plurality of types of content,
  for each of the plurality of types of content,
   predicting, based on the model, a personalized score for each content item in the type of content, wherein the personalized score represents an estimated level of user satisfaction with the content item when the content item is recommended to the user, and
   selecting a recommended content item of the type of content based on personalized scores of the content items of the type,
  selecting an overall recommended content item from the recommended content items of the plurality of types of content based on criteria associated with the personalized scores of the recommended content items,
  performing validation of the selected overall recommended content item based on a rule indicating whether a type of content of the selected overall recommended content item is allowed to be displayed at the slot, and
  allocating, based on a successful validation, the overall recommended content item to the slot; and
 providing the webpage with the plurality of slots allocated with content items to the user.

10. The medium of claim 9, wherein the recommended content item of the type of content has a highest personalized score among the content items of the type.

11. The medium of claim 9, wherein the criteria associated with the personalized scores of the recommended content items includes a first criterion corresponding to the overall recommended content item having a highest personalized score among the recommended content items in the plurality of types of content.

12. The medium of claim 9, wherein the criteria associated with the personalized scores of the recommended content items includes a second criterion corresponding to a number of a type of the overall recommended content item being less than threshold.

13. The medium of claim 9, wherein training data associated with the user includes a plurality of training data-records, each of which is represented by a four-tuple including:
 a first parameter corresponding to a type of a content item associated with the data-record,
 a second parameter corresponding to a probability that the content item is slotted,
 a third parameter corresponding to a feature vector of the content item and an associated contextual vector, and
 a fourth parameter corresponding to a personalized score of the content item.

14. The medium of claim 13, wherein the training data-record is associated with a weight computed based on the second parameter.

15. The medium of claim 9, wherein the plurality of types of content include at least documents, images, videos, and slideshows.

16. A system for content personalization, the system comprising at least one processor configured to:
 construct, by a content blending engine, a webpage for a user having a plurality of slots each of which is to be allocated with a content item;
 generate, by the content blending engine, via machine learning based on training data associated with the user, a model for estimating user satisfaction;
 for each of the plurality of slots, by the content blending engine,
  access a plurality of content items in a plurality of types of content,
  for each of the plurality of types of content,
   predict, based on the model, a personalized score for each content item in the type of content, wherein the personalized score represents an estimated level of user satisfaction with the content item when the content item is recommended to the user, and
   select a recommended content item of the type of content based on personalized scores of the content items of the type,
  select an overall recommended content item from the recommended content items of the plurality of types of content based on criteria associated with the personalized scores of the recommended content items,
  perform validation of the selected overall recommended content item based on a rule indicating whether a type of content of the selected overall recommended content item is allowed to be displayed at the slot, and
  allocate, based on a successful validation, the overall recommended content item to the slot; and provide, by the content blending engine, the webpage with the plurality of slots allocated with content items to the user.

17. The system of claim 16, wherein the recommended content item of the type of content has a highest personalized score among the content items of the type.

18. The system of claim 16, wherein the criteria associated with the personalized scores of the recommended content items includes a first criterion corresponding to the overall recommended content item having a highest personalized score among the recommended content items in the plurality of types of content.

19. The system of claim 16, wherein the criteria associated with the personalized scores of the recommended content items includes a second criterion corresponding to a number of a type of the overall recommended content item being less than threshold.

20. The system of claim 16, wherein training data associated with the user includes a plurality of training data-records, each of which is represented by a four-tuple including:
- a first parameter corresponding to a type of a content item associated with the data-record,
- a second parameter corresponding to a probability that the content item is slotted,
- a third parameter corresponding to a feature vector of the content item and an associated contextual vector, and
- a fourth parameter corresponding to a personalized score of the content item.

21. The system of claim 20, wherein the training data-record is associated with a weight computed based on the second parameter, wherein the weight is inversely proportional to the second parameter.

* * * * *